(12) United States Patent
Collins et al.

(10) Patent No.: US 7,343,936 B2
(45) Date of Patent: *Mar. 18, 2008

(54) WATER PIPE COUPLING WITH OFF-CENTERED PIERCING ASSEMBLY FOR TEAR OUT DISK AND METHOD OF REMOVING DISK

(75) Inventors: Fred Collins, Rio Rico, AZ (US); Albert A. Amparan, East Highlands, CA (US); Mark J. Cataldo, Riverside, CA (US)

(73) Assignee: MCP Industries, Inc., Corona, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/503,534

(22) Filed: Aug. 11, 2006

(65) Prior Publication Data

US 2007/0102054 A1    May 10, 2007

Related U.S. Application Data

(63) Continuation of application No. 11/267,015, filed on Nov. 4, 2005, now Pat. No. 7,089,964.

(51) Int. Cl.
*F16L 55/12* (2006.01)

(52) U.S. Cl. .................... 138/90; 138/89; 137/68.19; 137/68.3; 73/49.8; 73/49.1

(58) Field of Classification Search ............. 138/90, 138/89, 94; 137/68.3, 68.19, 68.24, 68.27; 73/49.5, 49.1, 49.8
See application file for complete search history.

(56) References Cited

U.S. PATENT DOCUMENTS

| | | | |
|---|---|---|---|
| 3,654,965 A * | 4/1972 | Gramain .................... 138/89 |
| 3,844,585 A * | 10/1974 | Sands et al. .................... 285/3 |
| 4,376,597 A * | 3/1983 | Britton et al. ........... 405/195.1 |
| 4,429,568 A * | 2/1984 | Sullivan ..................... 73/49.8 |
| 4,602,504 A * | 7/1986 | Barber ....................... 73/49.8 |
| 4,706,482 A * | 11/1987 | Barber ....................... 73/49.8 |
| 4,739,799 A * | 4/1988 | Carney et al. ................ 138/89 |
| 4,763,510 A * | 8/1988 | Palmer .................... 73/40.5 R |
| 4,848,155 A * | 7/1989 | Huber ......................... 73/49.8 |
| 4,902,043 A * | 2/1990 | Zillig et al. .................... 285/4 |
| 4,936,350 A * | 6/1990 | Huber ........................ 138/90 |
| 5,033,510 A * | 7/1991 | Huber ........................ 138/90 |
| 5,076,312 A * | 12/1991 | Powell .................... 137/68.25 |
| 5,078,429 A * | 1/1992 | Braut et al. .................... 285/4 |
| 5,106,127 A * | 4/1992 | Briet ............................. 285/4 |
| 5,163,480 A * | 11/1992 | Huber ........................ 138/94 |
| 5,507,501 A * | 4/1996 | Palmer ....................... 277/602 |
| 5,711,536 A * | 1/1998 | Meyers ....................... 277/606 |

(Continued)

*Primary Examiner*—Patrick F. Brinson
(74) *Attorney, Agent, or Firm*—John J. Connors; Connors & Assoc. Inc.

(57) ABSTRACT

A coupling used during testing of a water line including an upstream pipe and a downstream pipe connected by the coupling. A removable barrier disk prevents water from flowing through the connected pipes until after testing, when the disk is then detached from the body member of the coupling. A piercing assembly interacts with a groove near the perimeter of the disk to initiate a tear that propagates along the groove as the disk is pulled away from the body member of the coupling. The piercing assembly is attached to the disk by a fulcrum element offset with respect to a center of the planar disk.

10 Claims, 19 Drawing Sheets

U.S. PATENT DOCUMENTS

| | | | | |
|---|---|---|---|---|
| 5,740,830 A * | 4/1998 | Mankins | ................... | 137/15.07 |
| 5,882,014 A * | 3/1999 | Gavin | ........................ | 277/602 |
| 6,032,515 A * | 3/2000 | Huber | ........................ | 73/49.1 |
| 6,082,183 A * | 7/2000 | Huber | ........................ | 73/49.1 |
| 6,085,362 A * | 7/2000 | Huber | ........................ | 4/252.4 |
| 6,085,363 A * | 7/2000 | Huber | ........................ | 4/252.4 |
| 6,182,704 B1 * | 2/2001 | Bevacco | ...................... | 138/89 |
| 6,209,584 B1 * | 4/2001 | Huber | ........................ | 138/89 |
| 6,234,007 B1 * | 5/2001 | Pampinella | ................. | 73/49.8 |
| 6,267,001 B1 * | 7/2001 | Duncan | ...................... | 73/49.8 |
| 6,575,475 B1 * | 6/2003 | Duncan | ...................... | 277/607 |
| 6,588,454 B1 * | 7/2003 | Johnson et al. | ................ | 138/90 |
| 6,595,242 B2 * | 7/2003 | Duncan | ...................... | 138/90 |
| 6,622,748 B2 * | 9/2003 | Duncan | ...................... | 137/68.3 |
| 6,755,215 B2 * | 6/2004 | Duncan | ...................... | 138/90 |
| 6,915,819 B2 * | 7/2005 | Duncan | ...................... | 138/90 |
| 6,976,499 B2 * | 12/2005 | Duncan | ...................... | 137/68.3 |

* cited by examiner

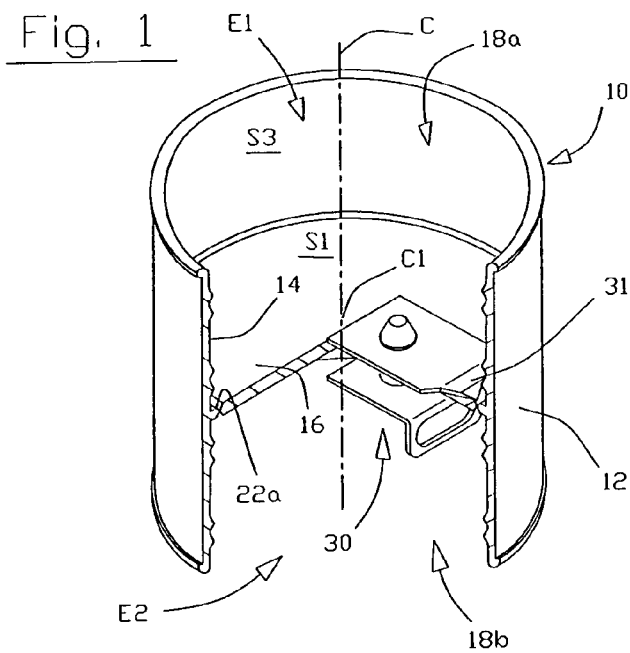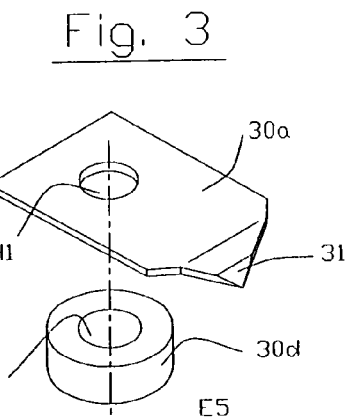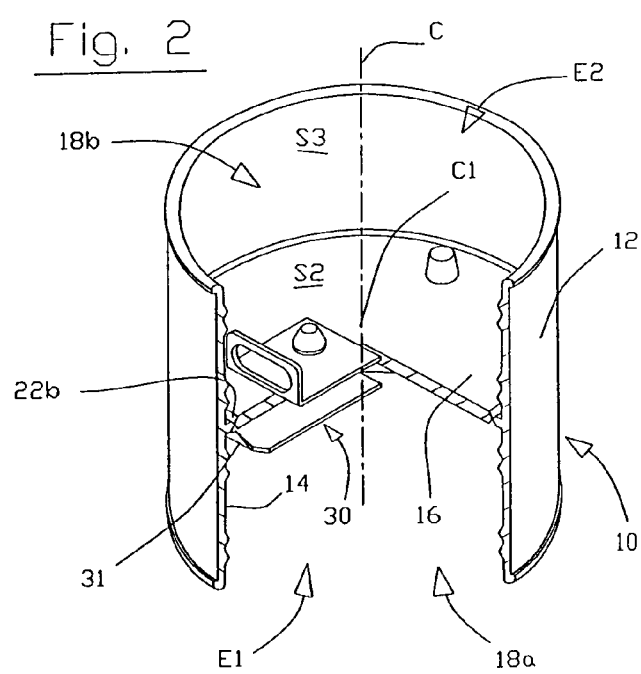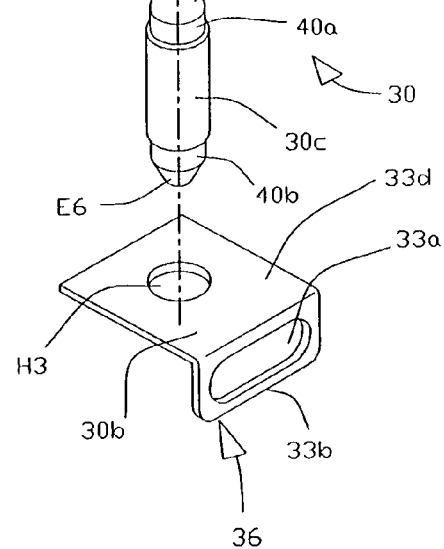

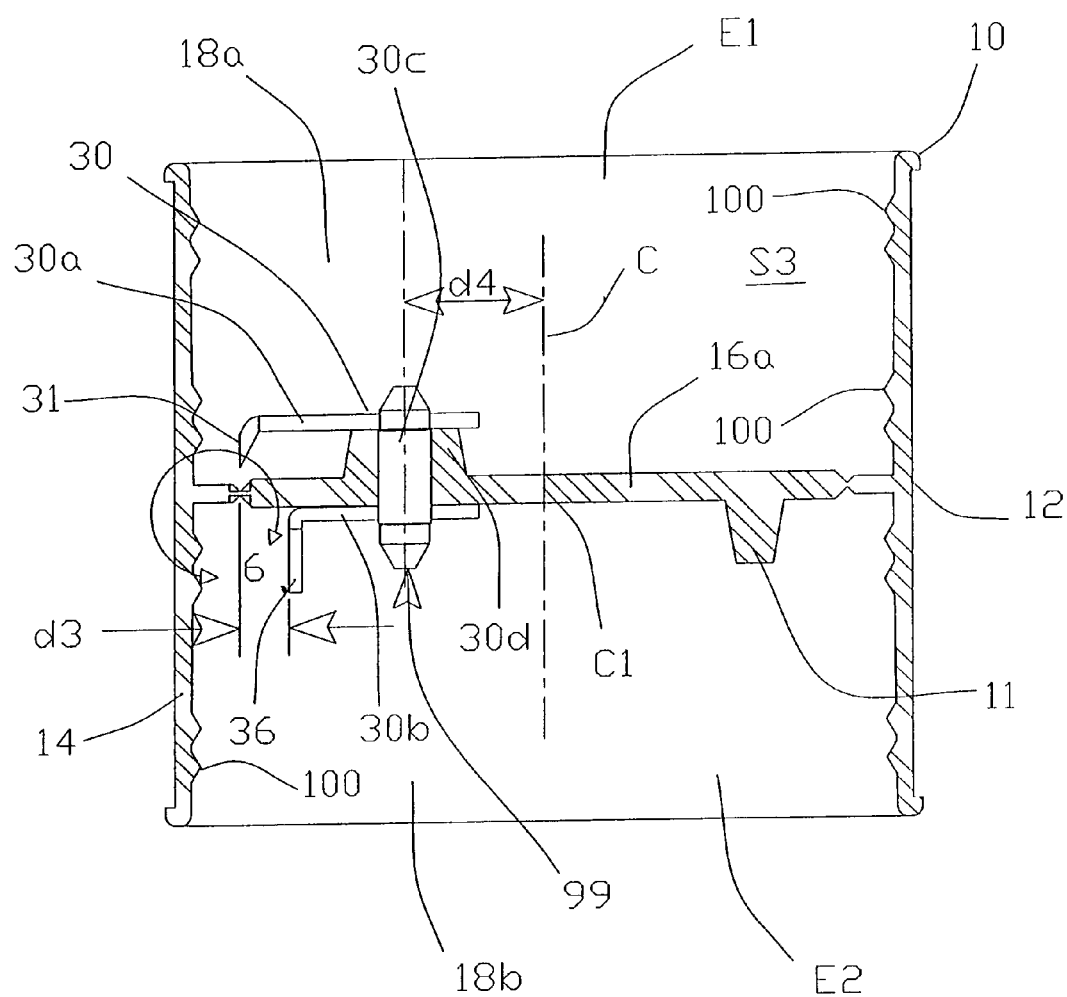

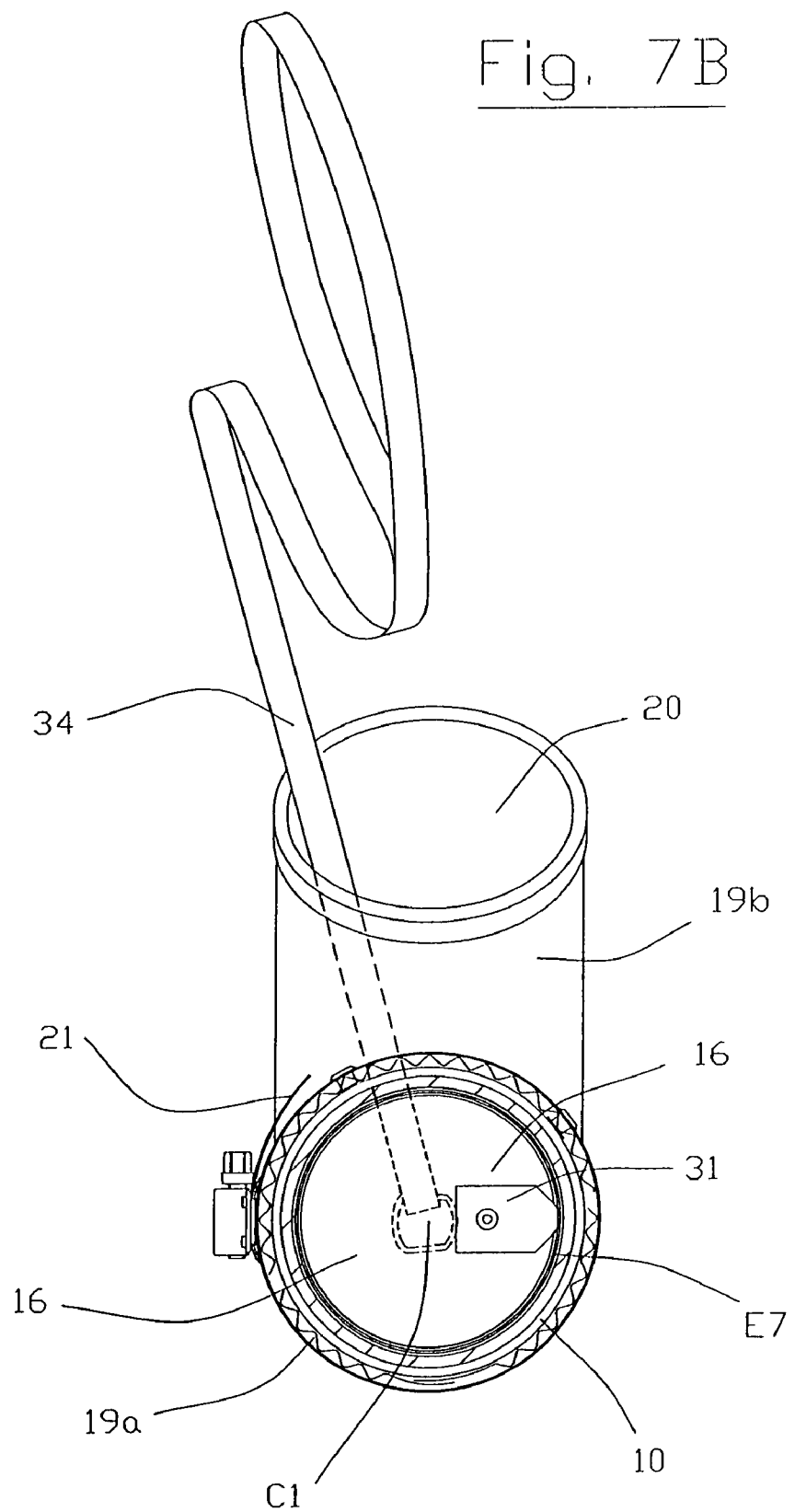

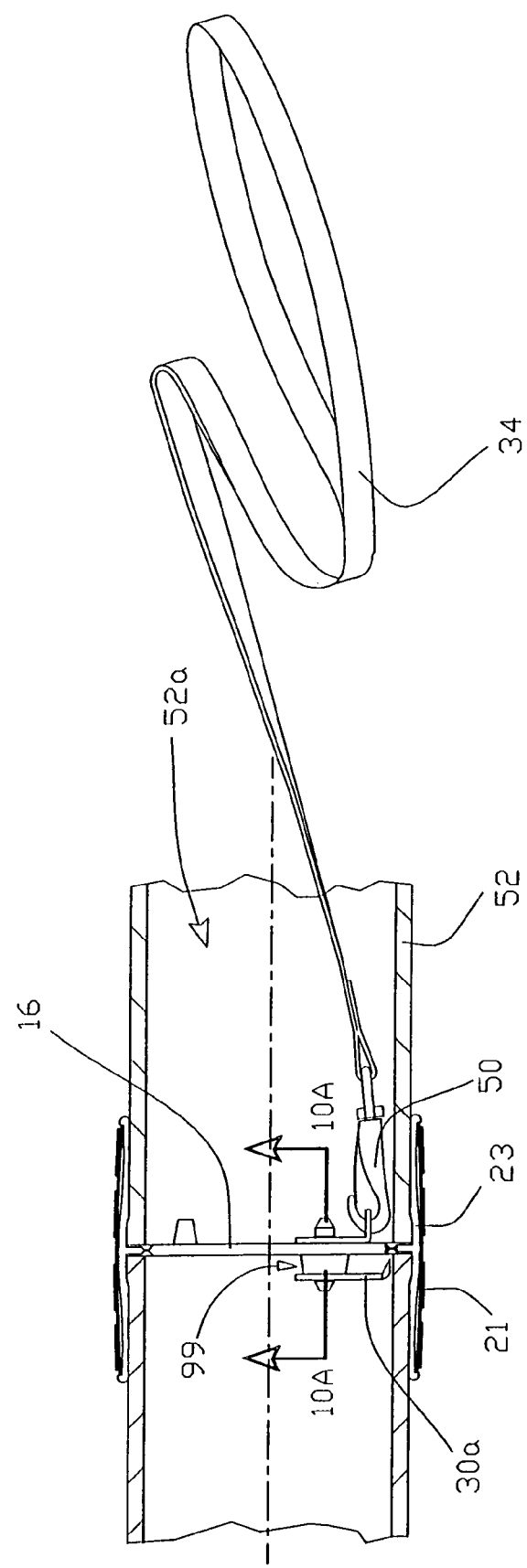

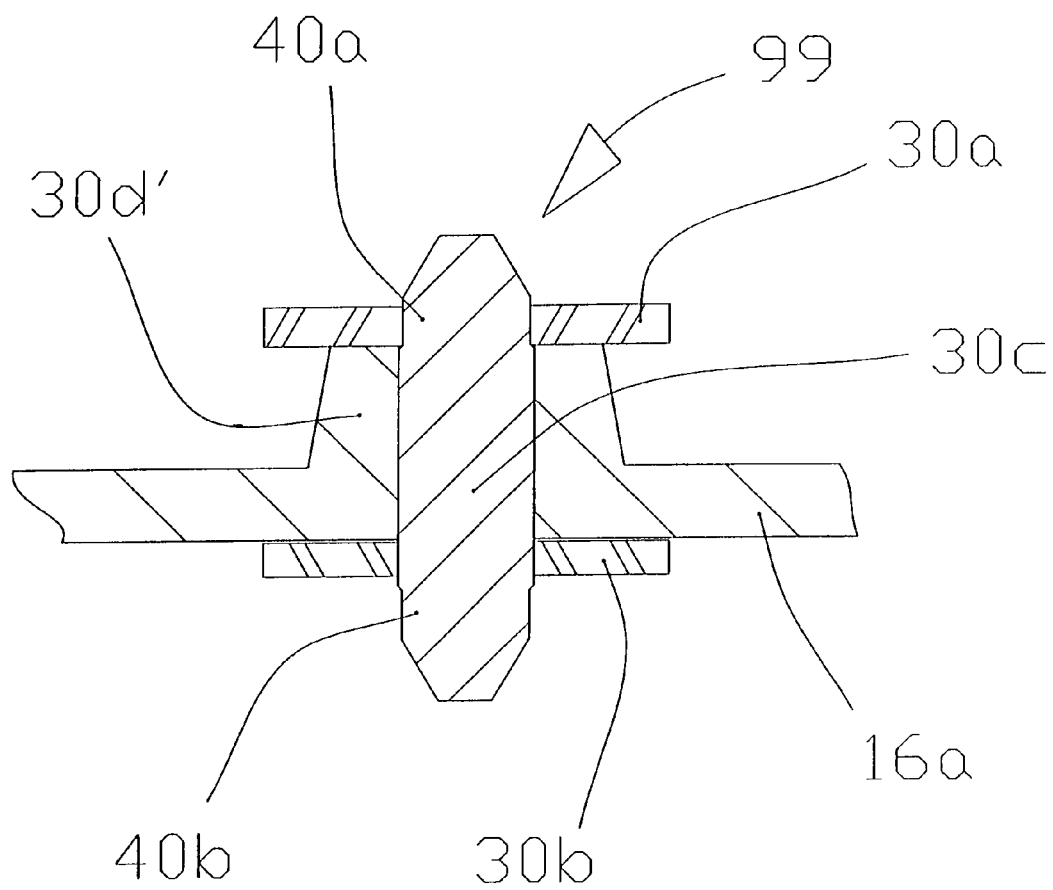

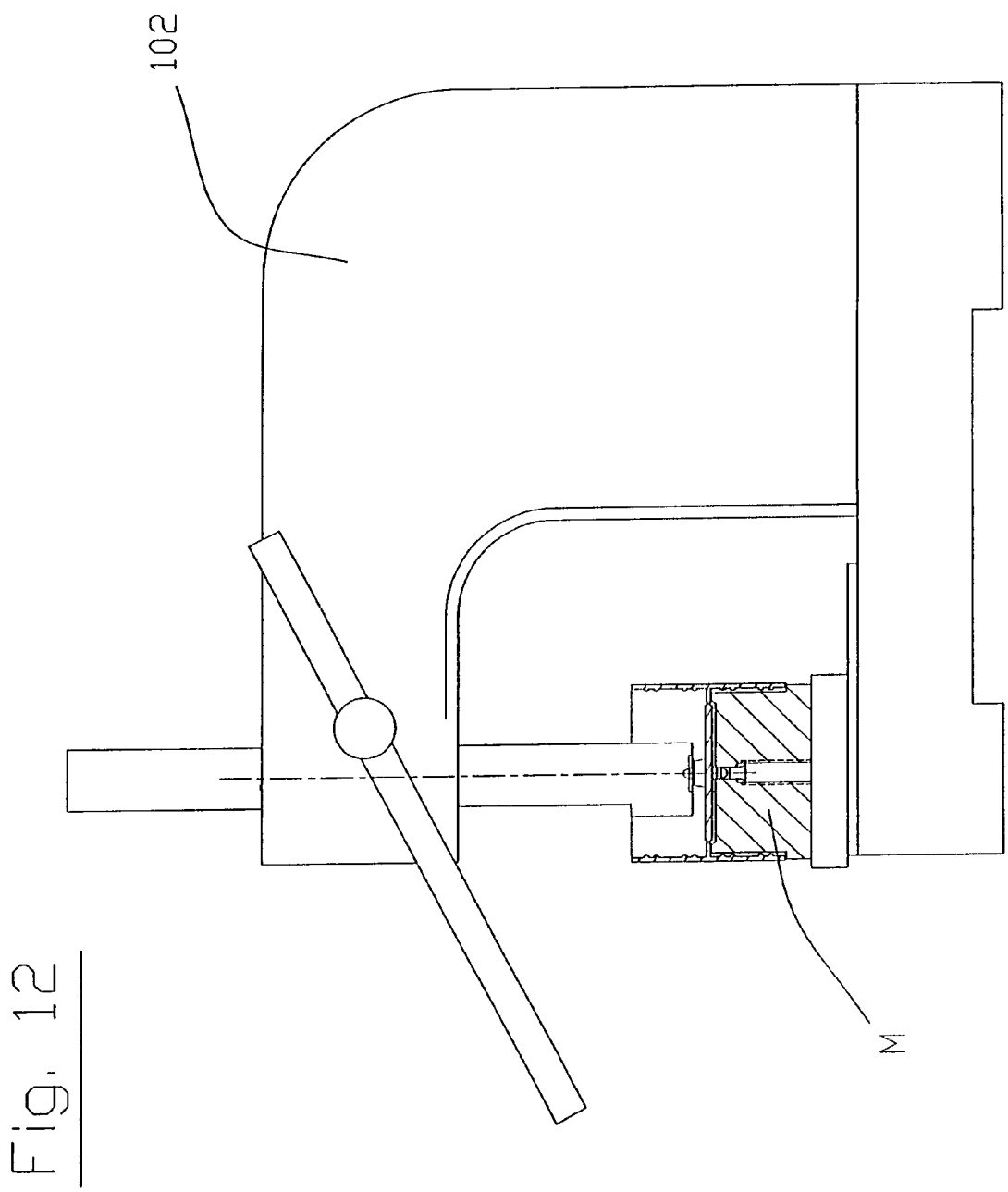

WATER PIPE COUPLING WITH OFF-CENTERED PIERCING ASSEMBLY FOR TEAR OUT DISK AND METHOD OF REMOVING DISK

RELATED PATENT APPLICATION

This application is continuation application of U.S. utility patent application Ser. No. 11/267,015, entitled "WATER PIPE COUPLING WITH OFF-CENTERED PIERCING ASSEMBLY FOR TEAR OUT DISK & METHOD OF REMOVING DISK." filed Nov. 4, 2005, now U.S. Pat. No. 7,089,964. This related application is incorporated herein by reference and made a part of this application.

INCORPORATION BY REFERENCE

The inventor incorporates herein by reference any and all U.S. patents, U.S. patent applications, and other documents, hard copy or electronic, cited or referred to in this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

BACKGROUND OF INVENTION

U.S. Pat. Nos. 6,575,475; 6,595,242; 6,622,748; and 6,755,215 disclose a coupling used in testing water lines. This coupling includes a unitary, molded rubber or plastic cylindrical wall member with an internal removable disk between open ends of the cylindrical wall member. An annular ledge remains on the inside surface of the cylindrical wall member upon removal of the disk to form a pipe stop. A water pipe is placed in each open end of the cylindrical wall member to form a water line. An end of each water pipe is inserted into the open ends of the cylindrical wall member to abut opposite sides of the pipe stop. The thickness of this pipe stop is about 0.1 inch, and its maximum width is about 0.28 inch. The width is about equal to the wall thickness of the water pipes.

The water pipes may each be linear, non-branched pipes or one of the water pipes may be branched, for example a Tee-fitting or a Wye-fitting water pipe. A Tee-fitting water pipe has a straight section and branch section at a right angle to the straight section; a Wye-fitting water pipe has a straight section and branch section extending from its straight section at an acute angle. A pressure test is then conducted with water under pressure being fed into the upstream pipe, applying pressure to the upstream side of the disk. The elevated water pressure forces water through any upstream cracks or improperly sealed joints. Consequently, any leaks in any pipe joint or pipes upstream of the disk are thus located.

After testing, the disk is manually removed by tearing it away from the cylindrical wall member, thereby allowing water to flow through the coupled together upstream and downstream water pipes. This is accomplished typically by a pull member, for example, a strap having one end attached to the disk and another end extending from an opening in the downstream water pipe. This opening has a diameter sufficiently large to allow the disk torn from the cylindrical wall member to be pulled through the opening. After removal of the disk, water flows through the coupled together water pipes.

In U.S. Pat. No. 6,622,748 a cantilever device is used to puncture the disk to initiate a tear along a helical score line in the disk. One problem with this cantilever device is that, upon pressurizing the upstream water pipe, the disk bulges and a pointed tip of a piercing element of the cantilever device sometimes punctures the disk prematurely. Premature puncture of the disk prevents accomplishing the test because a leak in the disk is created through which water seeps. Another problem is that the helical score line often produces a jagged edge in the pipe stop that protrudes into the open cross-sectional flow area. After removal of the disk, the pipe stop should have an exposed edge that is smooth and circular and free of remnants that protrude into the open cross-sectional flow area. A jagged edge may reduce the "effective" open cross-sectional flow area of the pipe to create a flow obstruction to a degree that the water line fails to meet required plumbing specifications. Moreover, in some cases when using a downstream Wye-fitting water pipe, complete disk removal may not be achieved by simply pulling on the disk using the pull member.

SUMMARY OF INVENTION

This invention has one or more features as discussed subsequently herein. After reading the following section entitled "DETAILED DESCRIPTION OF SOME EMBODIMENTS OF THIS INVENTION," one will understand how the features of this invention provide its benefits. The benefits of this invention include, but are not limited to: (a) a simple way to remove the disk in a coupling used in testing a water line, (b) avoiding premature puncturing of a barrier disk during testing of a water line, and (c) an improved piercing assembly, and its relationship to a tear groove, that provides in the coupling, after disk removal, a pipe stop that has an edge that is smooth and circular, avoiding disrupting fluid flow.

Without limiting the scope of this invention as expressed by the claims that follow, some, but not necessarily all, of its features are:

One, the coupling of this invention may include a single piece body member molded as a unitary structure. For example, it may be molded from rubber or plastic and is elastic and resilient. The body member includes an upstream wall section having an internal circumferential configuration substantially the same as the circumferential configuration of the upstream pipe to be received therein, and a downstream wall section having an internal circumferential configuration substantially the same as the circumferential configuration of the downstream pipe to be received therein. This body member typically is a hollow cylinder.

Two, a removable disk disposed between the upstream wall section and the downstream wall section initially blocks the flow of water between the pipes until removed. This disk is planar and has a perimeter with an adjacent groove on an upstream side of the disk. The disk may be circular and the groove may be substantially circular and substantially continuous and be substantially V-shaped. On the downstream side of the disk there may be a second groove having the same configuration and dimensions as the groove of the upstream side. This second groove is in substantial registration with the groove on the upstream side of the disk. For example, the second groove may be a substantially circular and substantially continuous and substantially V-shaped.

The groove on the upstream side of the disk has an outer perimeter offset inward from the wall sections a predetermined distance substantially from 0.10 to 0.28 inch to provide, upon removal of the planar disk, a ledge extending outward from an inside surface of the wall sections substantially at a right angle to the wall sections to form a pipe stop. This enables an end of the upstream pipe to abut one side of the pipe stop and an end of the downstream pipe to abut another side of the pipe stop. The pipe stop may have a predetermined thickness and the disk may have a thickness that is greater than the predetermined thickness of the pipe stop.

Three, a piercing assembly is attached to the planar disk by a fulcrum element offset with respect to a center of the planar disk. The fulcrum element provides a fulcrum or pivot point along the disk about which the piercing assembly rotates, This fulcrum element is displaced away from the center of the disk towards the wall sections of the body member. This displacement from the center of the disk is substantially from 0.1 to 1.5 inch. A piercing member is mounted on the upstream side of the disk and a lever member is mounted on the downstream side of the disk. The piercing member has a piercing end or tip aligned with the groove. This piercing tip may be within the groove or displaced from the groove. Spacing the piercing tip away from the groove, however, reduces the risk of accidentally puncturing the disk during assembly of the coupling and its installation. Additionally, with the piercing tip displaced from the groove premature puncturing is avoided during testing of the water line. Thus, the piercing tip may be in the groove or spaced from the groove a distance of substantially 0.1 inch. The lever member is mounted to the disk on a downstream side of the disk to enable the disk to be manually pulled from the body member of the coupling. A pulling member having one end attached to the lever member and another end extending from an opening in the downstream pipe is used to pull against the lever member to rotate the piercing assembly about the fulcrum element so the piercing end of the piercing member punctures the disk at the groove to initiate a tear that propagates along the groove as the pulling member is drawn through the opening.

These features are not listed in any rank order nor is this list intended to be exhaustive.

This invention also includes a method of testing a water line where the downstream pipe is a linear pipe or a branched pipe. In this method the piercing assembly includes a fulcrum element offset from the disk's center so its fulcrum or pivot point is displaced from the disk's center as discussed above. One embodiment of this method is uniquely suited for use with a downstream Wye-fitting water pipe with a branched section at an acute angle, for example substantially from about 30 to 60 degrees, with respect to a longitudinal centerline of the Wye-fitting's straight section. The branch section may terminate in a side opening through which the detached disk is manually pulled. Especially in such a case, the coupling and the pipes are positioned with respect to each other so that the piercing end of the piercing member is within a zone in the upstream pipe having an area that corresponds to substantially half of the cross-sectional area of the upstream pipe that is furthest from the side opening. A tool is used to push inward on a portion of the pulling member having one end attached to the lever member and another end extending from the side opening. A user extends the tool through the side opening and concurrently pulls on the pulling member while the tool engages the pulling member to separate completely the disk from the body member of the coupling.

DESCRIPTION OF THE DRAWING

Some embodiments of this invention, illustrating all its features, will now be discussed in detail. These embodiments depict the novel and non-obvious water pipe coupling and method of removing its disk as shown in the accompanying drawing, which is for illustrative purposes only. This drawing includes the following figures (Figs.), with like numerals indicating like parts:

FIG. 1 is a perspective view, with sections broken away, of the body member of the coupling of this invention looking into the upstream end of the body member.

FIG. 2 is a perspective view, with sections broken away, of the body member shown in FIG. 1 looking into the downstream end of the body member.

FIG. 3 is an exploded perspective view of one embodiment of the piercing assembly used in the coupling of this invention.

FIG. 5 is a cross-sectional view of the body member of the coupling of this invention depicting an alternate embodiment of the piercing assembly having a spacer formed during molding of the body member.

FIG. 7B is a sectional view similar to that shown in FIG. 7 with the piercing assembly at a 3:00 o'clock position.

FIG. 8A is a cross-sectional view prior to the removal of the disk showing an upstream pipe inserted into an upstream end of the coupling of this invention and a downstream Wye-fitting water pipe inserted into a downstream end of the coupling of this invention with its branch section extending from its straight section at an acute angle with respect to its straight section.

FIG. 8B is a cross-sectional view similar to that of FIG. 8A with the barrier disk partially torn from the cylindrical wall of the body member of the coupling of this invention.

FIG. 8C is a cross-sectional view similar to that of FIG. 8B showing the use of a tool to provide leverage against a pulling member to enable complete removal of the disk from the cylindrical wall of the body member of the coupling of this invention.

FIG. 8D is a cross-sectional view similar to that of FIG. 8B depicting a downstream Wye-fitting water pipe having its branch section extending from its straight section at an obtuse angle with respect to its straight section.

FIG. 8E is an enlarged, fragmentary sectional view taken along line 8E of FIG. 8B.

FIG. 10 is a cross-sectional view of an alternate embodiment of the coupling of this invention installed in a water pipe without a branch section.

FIG. 10A is an enlarged, fragmentary cross-sectional view taken along line 10A-10A of FIG. 10 showing the alternate embodiment of the piercing assembly with the spacer molded in place during formation of the body member.

FIG. 12 is a side view, partially in cross-section, showing a press applying pressure to the assembly of the piercing member, pin, and lever member in the mandrel shown in FIG. 11.

DETAILED DESCRIPTION OF SOME EMBODIMENTS OF THIS INVENTION

Figure 4:
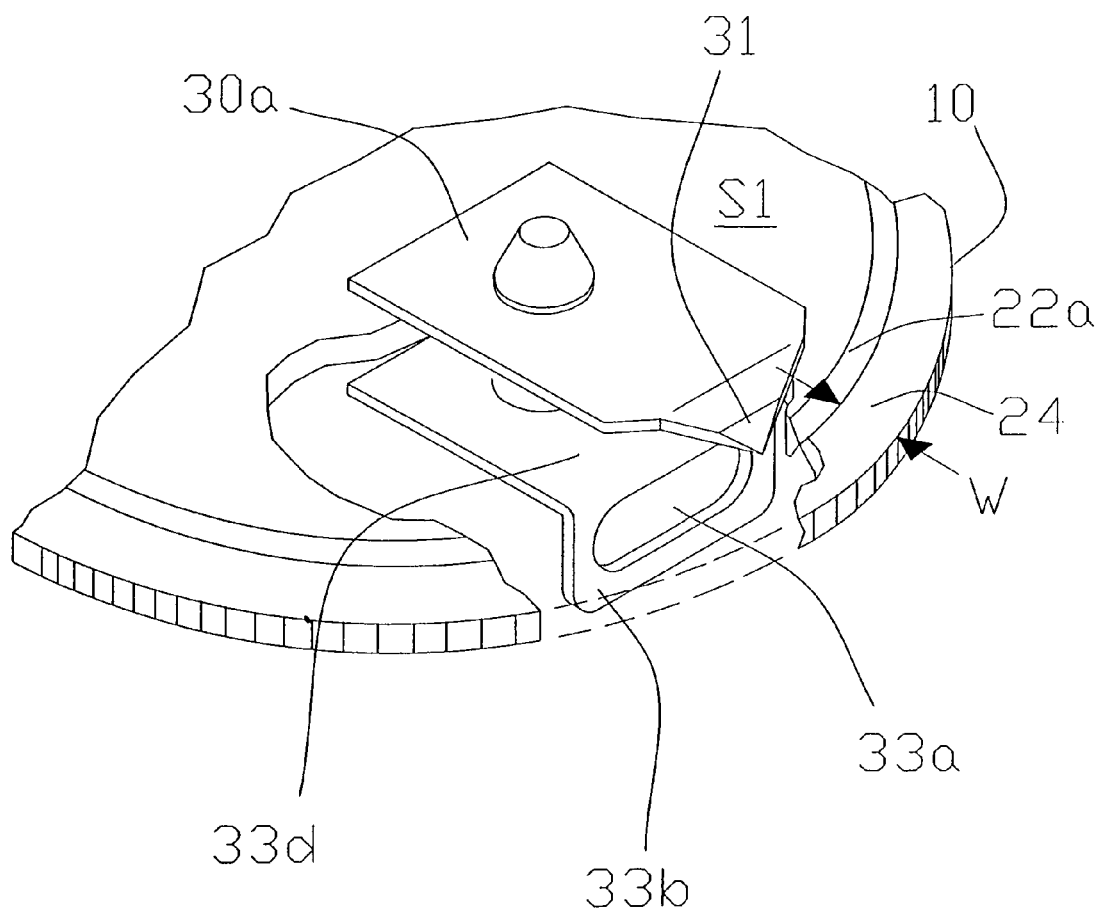
FIG. 4 is a fragmentary perspective view, with sections broken away, of a piercing assembly showing the piercing tip of the piercing member of the assembly overlying a circular groove in the upstream side of a barrier disk in the body member of the coupling of this invention.

As shown in FIGS. 1 through 5, one embodiment of this invention, the coupling 10, comprises an elastic and resilient, unitary body member 12 made of rubber or plastic. As illustrated in FIGS. 1 and 2, this body member 12 includes a substantially cylindrical wall member 14 having a longitudinal centerline C and a removable, substantially planar circular disk 16. The disk 16 is within the cylindrical wall member 14, is integral therewith, and is substantially at a right angle to the cylindrical wall member. The planar disk has a center C1 and the longitudinal centerline C intersects this center C1 substantially at a right angle to the disk 16. A metallic or plastic piercing assembly 30 is attached to the planar disk 16 and offset with respect to the center C1 of the disk. The piercing assembly 30 interacts with a groove 22a near the perimeter of the disk 16 to initiate a tear that propagates along the groove as the disk is pulled away from the body member of the coupling. As shown in FIG. 5, the interior surface S3 of the wall member 14 may include a series of concentric, longitudinally spaced apart, annular ribs 100 that assist in holding a water pipe in place when inserted into the coupling 10.

Figure 8A:
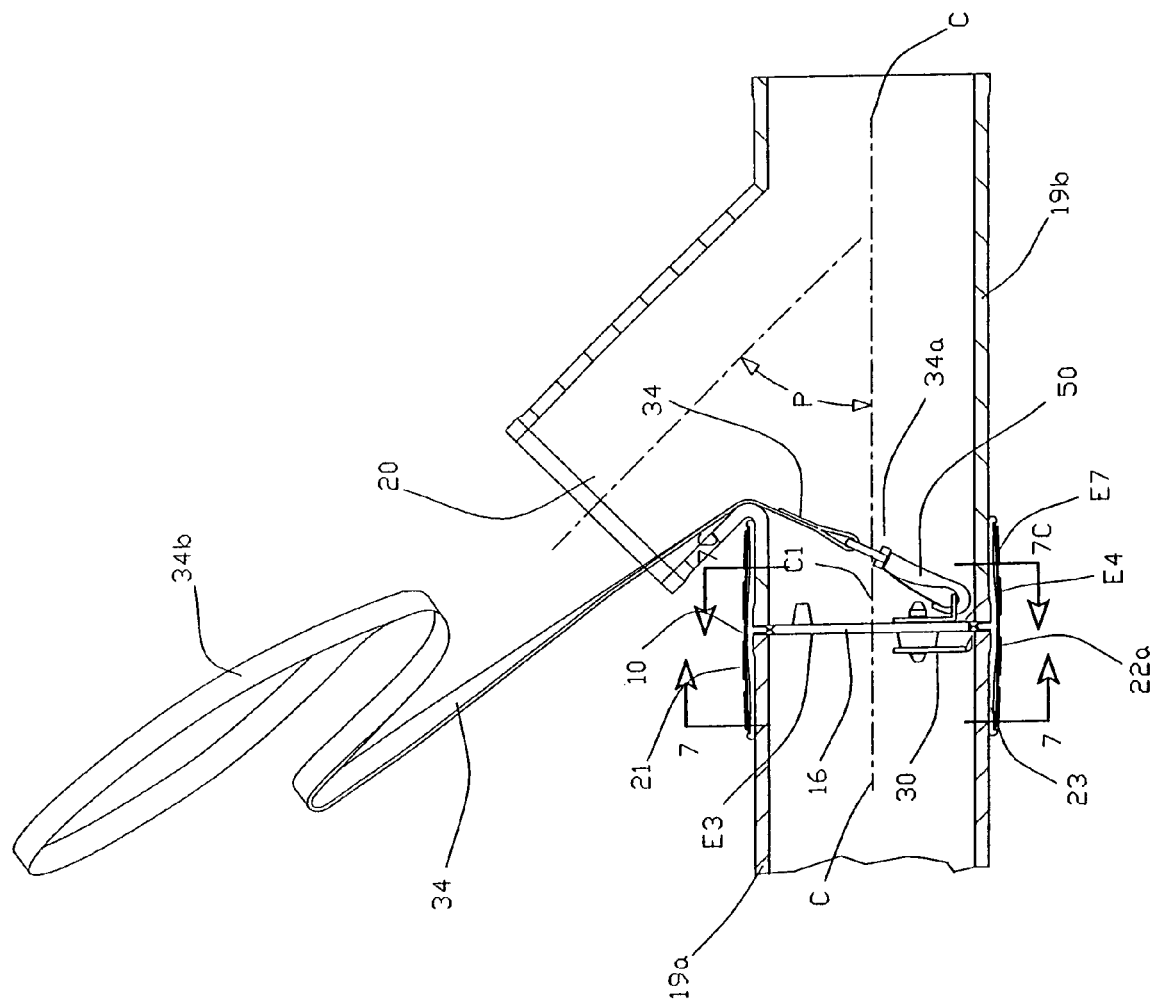
FIGS. 8A through 8E illustrate one embodiment of the method of this invention where
Figure 8B:
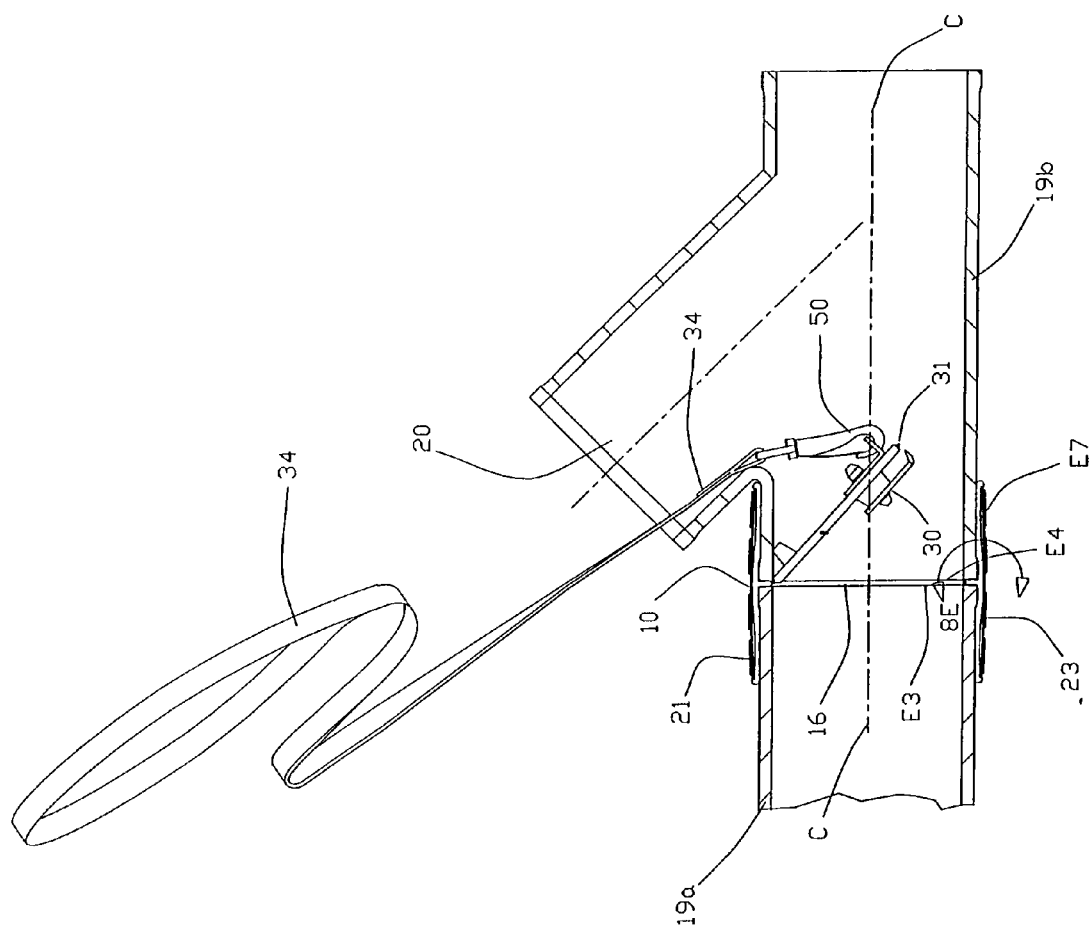
Figure 8C:
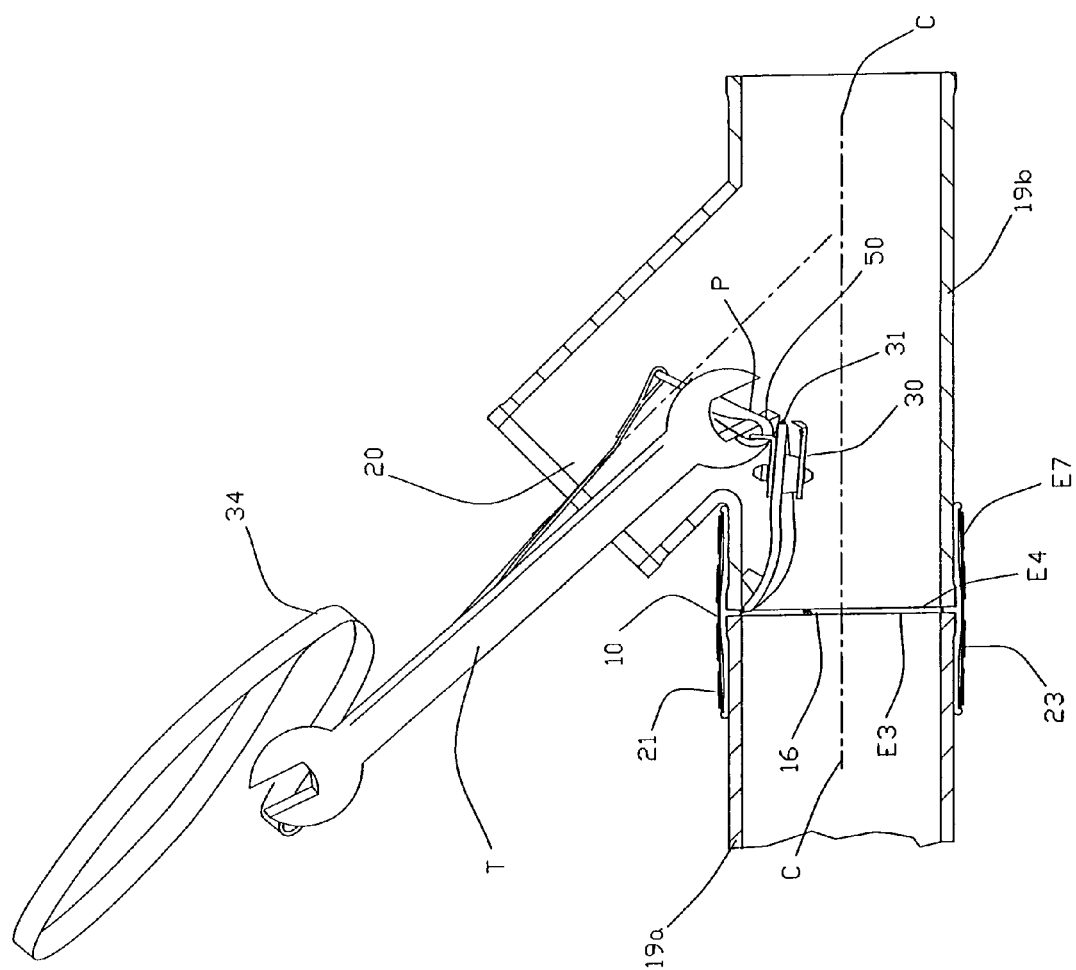
Figure 8D:
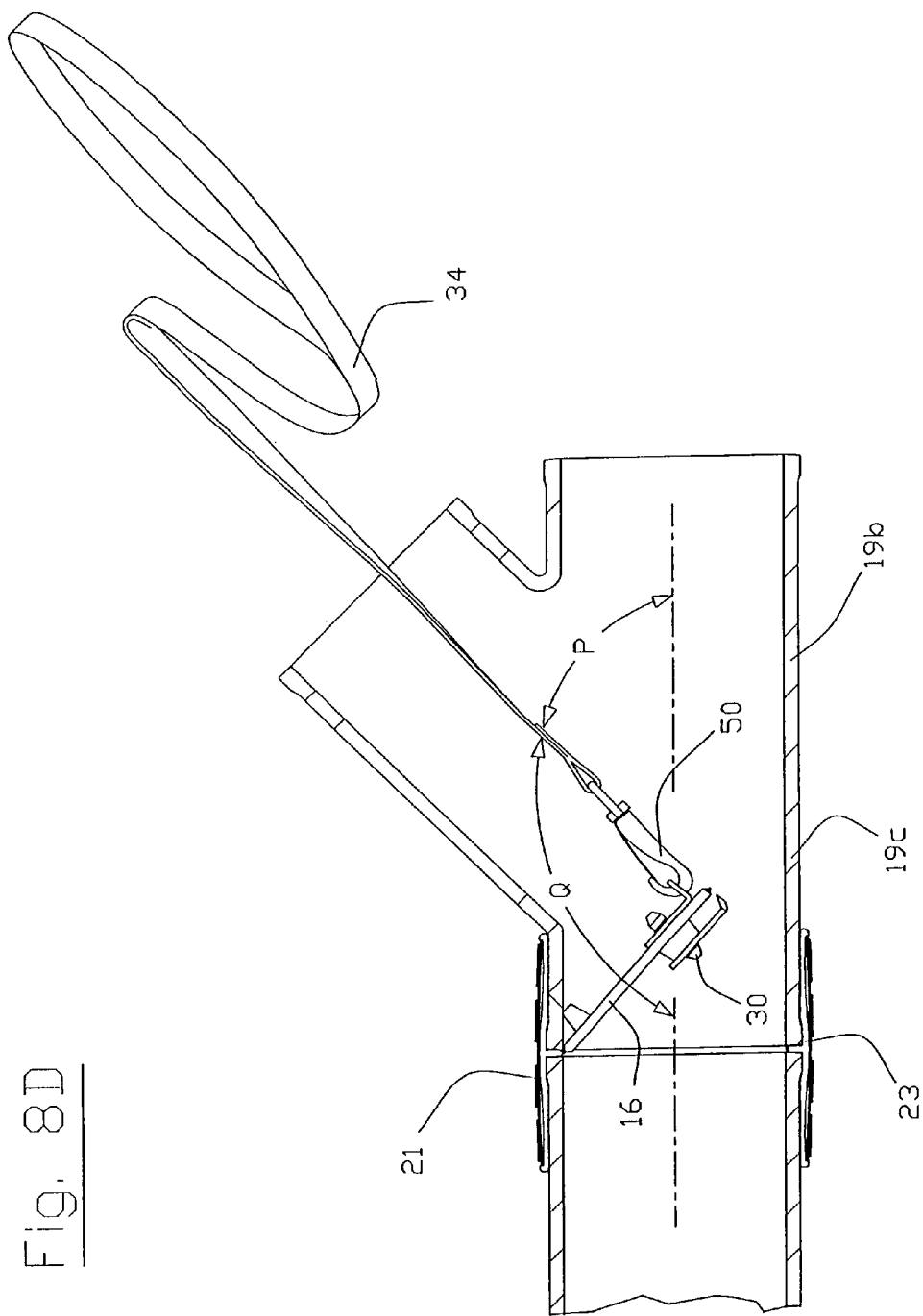

The planar disk 16 forms on opposite sides thereof and within the wall member 14 a cylindrical upstream cavity section 18a sized to receive a cylindrical upstream pipe 19a and a cylindrical downstream cavity section 18b sized to receive a cylindrical downstream pipe 19b. Each cavity section 18a and 18b, respectively, has an open end E1 and E2. The upstream wall section forming the cavity section 18a has an internal circumferential configuration substantially the same as the circumferential configuration of the upstream pipe 19a. The downstream wall section forming the cavity section 18b has an internal circumferential configuration substantially the same as the circumferential configuration of the downstream pipe 19b. The downstream pipe 19b has a side opening 20 (FIGS. 8A through 8C). The downstream pipe may be a Tee-fitting water pipe (not shown), or a Wye-fitting water pipe 19b connected as shown in FIGS. 8A-8C to provide an acute angle P facing the disk 16 prior to the disk being removed, or a Wye-fitting water pipe 19b connected as shown in FIG. 8D to provide an obtuse angle Q prior to the disk being removed, or a straight water pipe 19d as shown in FIG. 10.

As discussed subsequently in greater detail, when using a downstream Wye-fitting water pipe where its branched section is at an acute angle with respect to the longitudinal centerline of its straight section, a tool T (FIG. 8C), for example a wrench, is used to assist in pulling the disk 16 away from the body member 12 of the coupling 10. As depicted in FIG. 8D, when using the downstream Wye-fitting water pipe 19b where its branched section is at an obtuse angle with respect to the longitudinal centerline of its straight section, no tool is needed. The arrangement shown in FIG. 8D, however, is ordinarily not used and may be prohibited in some jurisdictions. Only in the circumstance depicted in FIG. 8C when the branched section of the downstream Wye-fitting water pipe is at an acute angle with respect to the longitudinal centerline of its straight section is the tool T employed to assist in removing the disk 16.

As depicted in FIGS. 8A-8C, the pipes 19a and 19b are respectively inserted into the open ends E1 and E2 of the upstream section 18a and downstream section 18b, with the internal ends E3 and E4, respectively, of these pipes abutting the surfaces S1 and S2 immediately adjacent the junction between the interior surface S3 of the wall member 14 and the disk 16. Metallic worm-drive clamps 21 and a shield device 23 (FIG. 7C) between the exterior of the body member 12 and the clamps hold the pipes 19a and 19b and body member 12 firmly together. Consequently, this assembly of pipes 19a and 19b and body member 12 does not separate when the upstream pipe 19a is pressurized with water during testing of a water line including this assembly of pipes and coupling. The shield 23 comprises a corrugated or non-corrugated, smooth member of circular cross-section substantially surrounding the body member 12 substantially along its entire length.

As best shown in FIG. 1, the planar disk 16 has an upstream surface S1 that faces the upstream pipe 19a and, as best shown in FIG. 2, a downstream surface S2 that faces the downstream pipe 19b. The upstream surface S1 has therein the groove 22a, which is substantially V-shaped and is substantially circular and is substantially continuous. The downstream side S2 of the disk 16 may also include a substantially circular and substantially continuous substantially V-shaped groove 22b having essentially the same diameter as the groove 22a. This V-shaped groove 22b is in substantial registration with the V-shaped groove 22a on the upstream side S1 of the disk 16. A truncated conical locator 11 (FIGS. 5 and 11) projecting outward from the side S2 of the disk 16 is used to properly position the piercing assembly 30 as subsequently discussed in greater detail.

Figure 6:
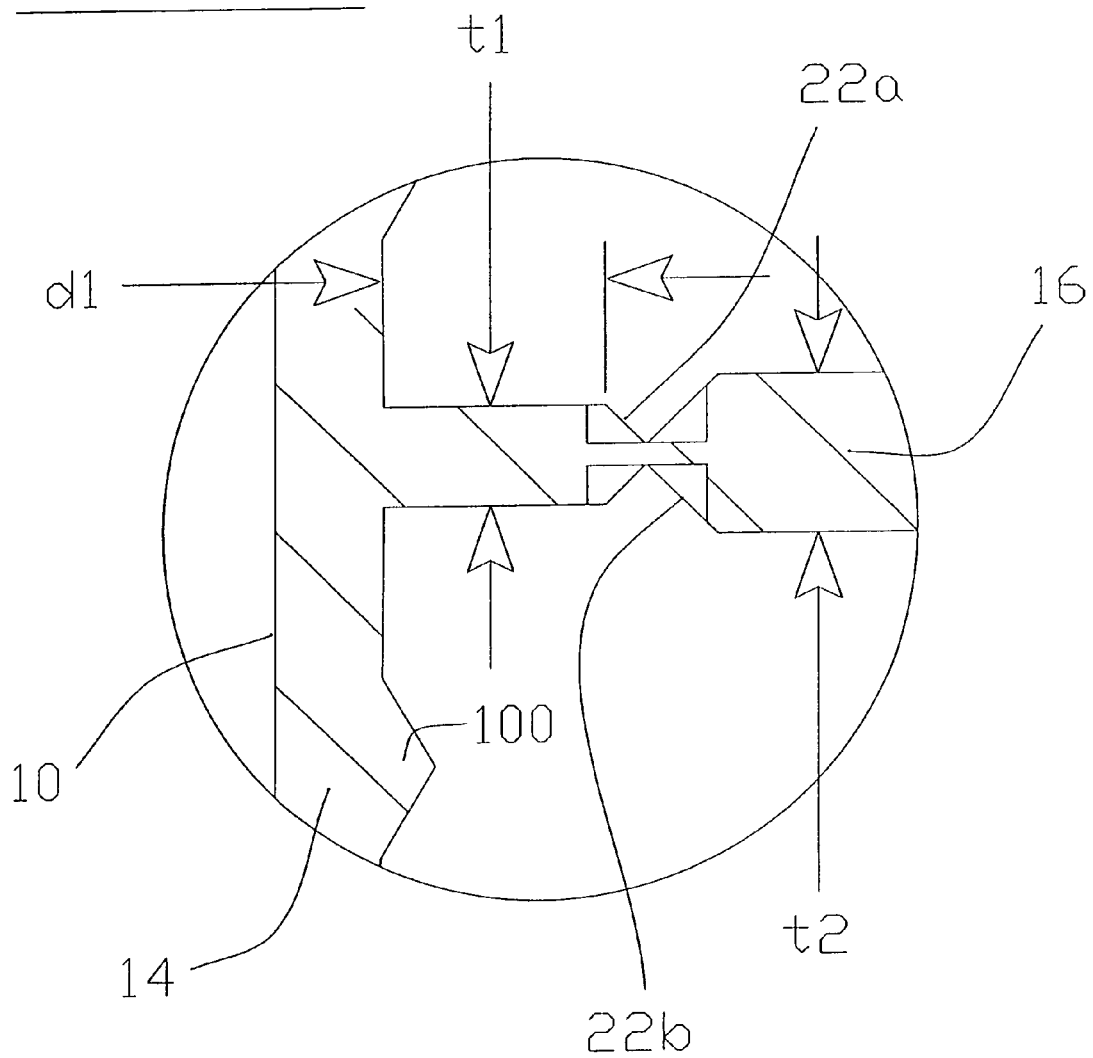
FIG. 6 is an enlarged, fragmentary, cross-sectional view taken along line 6 of FIG. 5.
Figure 8E:
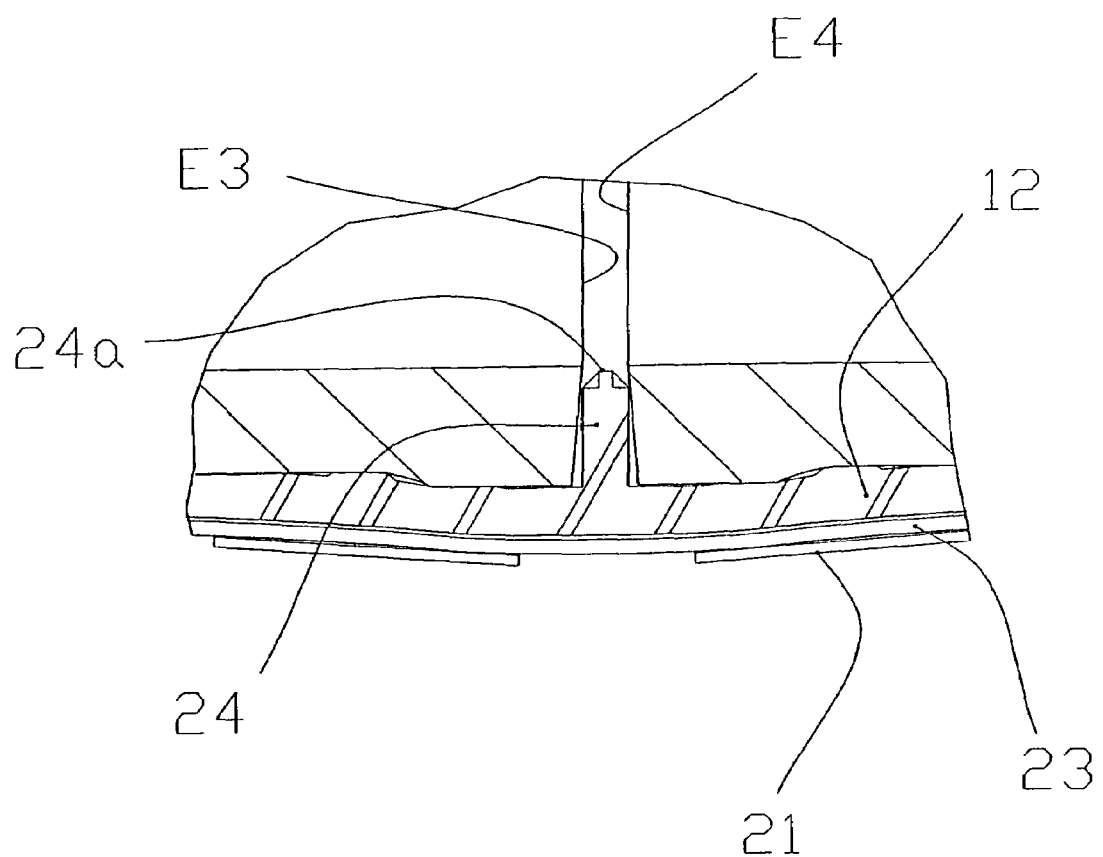

As shown in FIG. 6, both grooves 22a and 22b each have an outer perimeter offset inward from the interior surface S3 of the cylindrical wall member 14 a predetermined distance $d_1$ substantially from 0.10 to 0.28 inch. This distance $d_1$ is approximately equal to the wall thickness at the internal ends E3 and E4, respectively, of the pipes 19a and 19b. As best illustrated in FIG. 4, a substantially annular ledge 24 extending outward from the inside surface S3 of the cylindrical wall member 14 substantially at a right angle to the wall member provides a pipe stop upon removal of the planar disk 16. As depicted in FIG. 8E, this substantially avoids any significant overhang of an inner edge portion 24a of the pipe stop 24 when the barrier disk 16 is removed. As illustrated in FIG. 6, the pipe stop 24 has a thickness $t_1$ and the disk 16 has a thickness $t_2$ that is greater than the thickness $t_1$ of the pipe stop, substantially from 40 to 80% greater. This is desirable because extra thickness of the disk 16 inhibits or prevents a tear moving inward radially during removal of the disk. The width w (FIGS. 4 and 4A) of the pipe stop 24 is about equal to the wall thickness of the water pipes abutting it, which ordinarily have the same thickness.

There are two embodiments of the piercing assembly: The piercing assembly 30 shown best in FIG. 3 and the piercing assembly 99 shown best in FIGS. 5 and 10A. Referring to FIG. 3, the piercing assembly 30 includes an elongated metallic or plastic piercing member 30a adjacent to the upstream side S1 of the planar disk 16, a metallic or plastic, elongated lever member 30b adjacent to the downstream side S2 of the planar disk 16, a metallic pin 30c that extends through the disk 16 and is offset with respect to the center C1 of the planar disk, and a metallic or plastic annular spacer member 30d. Referring to FIGS. 5 and 10A, the piercing assembly 99 is similar to that of piercing assembly 30, with the main difference being the metallic annular spacer member 30d is not used. Instead, a disk 16a is employed which has a raised, truncated conical center member 30d' that serves as a spacer and provides additional surface area for bonding the pin 30c to the disk 16a during molding. As shown in FIG. 10A, the conical center member 30d' is made of rubber or plastic and is formed during molding of the body member 12. In essentially all other respects it is substantially identical to the piercing assembly 30.

In both embodiments the pin 30c serves as a fulcrum with its center providing a pivot point about which the assemblies 30 and 99 each individually rotate. The pin 30c is offset with respect to the center C1 of the barrier disks 16 or 16a, as the case may be. This offset distance $d_4$ (FIG. 5) is substantially from 0.1 to 1.5 inch. The offset distance $d_4$ varies depending on the diameter of the body member 12. For example, with a body member 12 having a 2-inch diameter the offset distance $d_4$ is substantially 0.15 inch; with a body member 12 having a 3 inch diameter the offset distance $d_4$ is substantially 0.65 inch; and with a body member 12 having a 4 inch diameter the offset distance $d_4$ is substantially 1.14 inch.

Figure 4A:
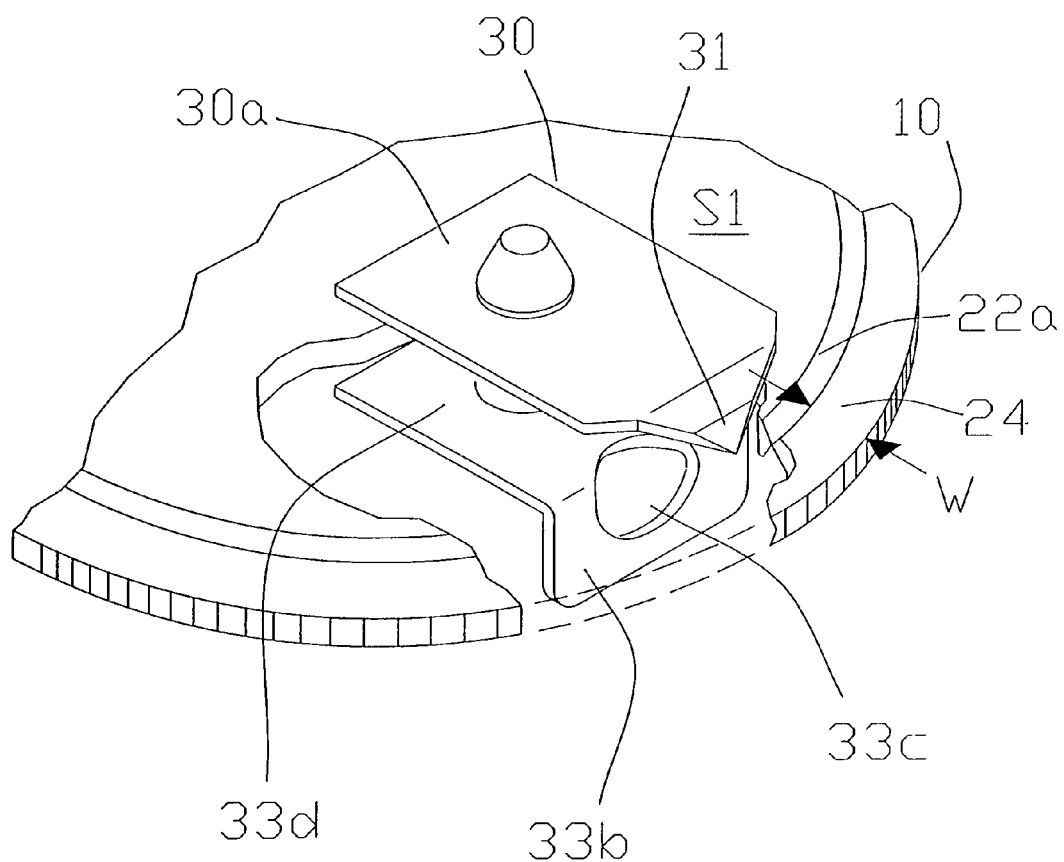
FIG. 4A is a fragmentary perspective view similar to that of FIG. 4 showing an alternate lever member for the piercing assembly.

The piercing member 30a has a piercing end 31, for example a pointed tip, aligned with the V-shaped groove 22a. As best depicted in FIG. 4, the lever member 30b has a pair of legs 33b and 33d at a right angle to form a substantially L-shape. Its one leg 33b an elongated slot 33a therein to which is attached, for example by tying, one end of the pulling member 34. As shown in FIG. 4A, an aperture 33c that overlaps the junction between the legs 33b and 33d of the lever member 30b may be used instead of the elongated slot 33a. This aperture 33c is preferred when using a clip 50 instead of tying an end of the pulling member 34 to the lever member 30b. The other leg 33d of the lever member 30b is oriented substantially in the same manner as the piercing member 30a and is substantially parallel thereto, and at a right angle to the leg 33b. As depicted in FIG. 5, the leg 33b forms an outer terminal end 36 that is offset inward from the groove 22b a distance $d_3$ that is substantially from 0.15 to 0.28 inch.

As illustrated in FIGS. 1-3, the pin 30c extends through the disk 16 and has one tapered end E5 projecting from the upstream side S1 of the disk and another tapered end E6 projecting from the downstream side S2 of the disk. The pin 30c is bonded to the disk 16 during molding. As best shown in FIG. 3, holes H1, H2, and H3, respectively in the piercing member 30a, spacer member 30d, and lever member 30b, are aligned. The pin 30c has, respectively, smaller diameter ends E5 and E6 to provide annular steps 40a and 40b. The hole H2 in the metallic spacer 30d is about equal to the diameter of the pin 30c. The holes H1 and H3 are located, respectively, in inner terminal ends of the piercing member 30a and lever member 30b. The hole H1 has a diameter slightly less than the diameter of the pin 30c, so the piercing member 30a is forced or press fitted onto the end E5 of the pin 16 until the piercing member abuts the step 40a. The hole H3 has a diameter about equal to the diameter of the pin 30c, so the lever member 30b passes over the end E6 and is forced or press fitted onto an intermediate portion of the pin 16 until the lever member abuts and presses firmly against the downstream side S2 of the disk 16. Consequently, the piercing member 30a and the lever member 30b do not rotate with respect to each other or the pin 30c.

Figure 9:
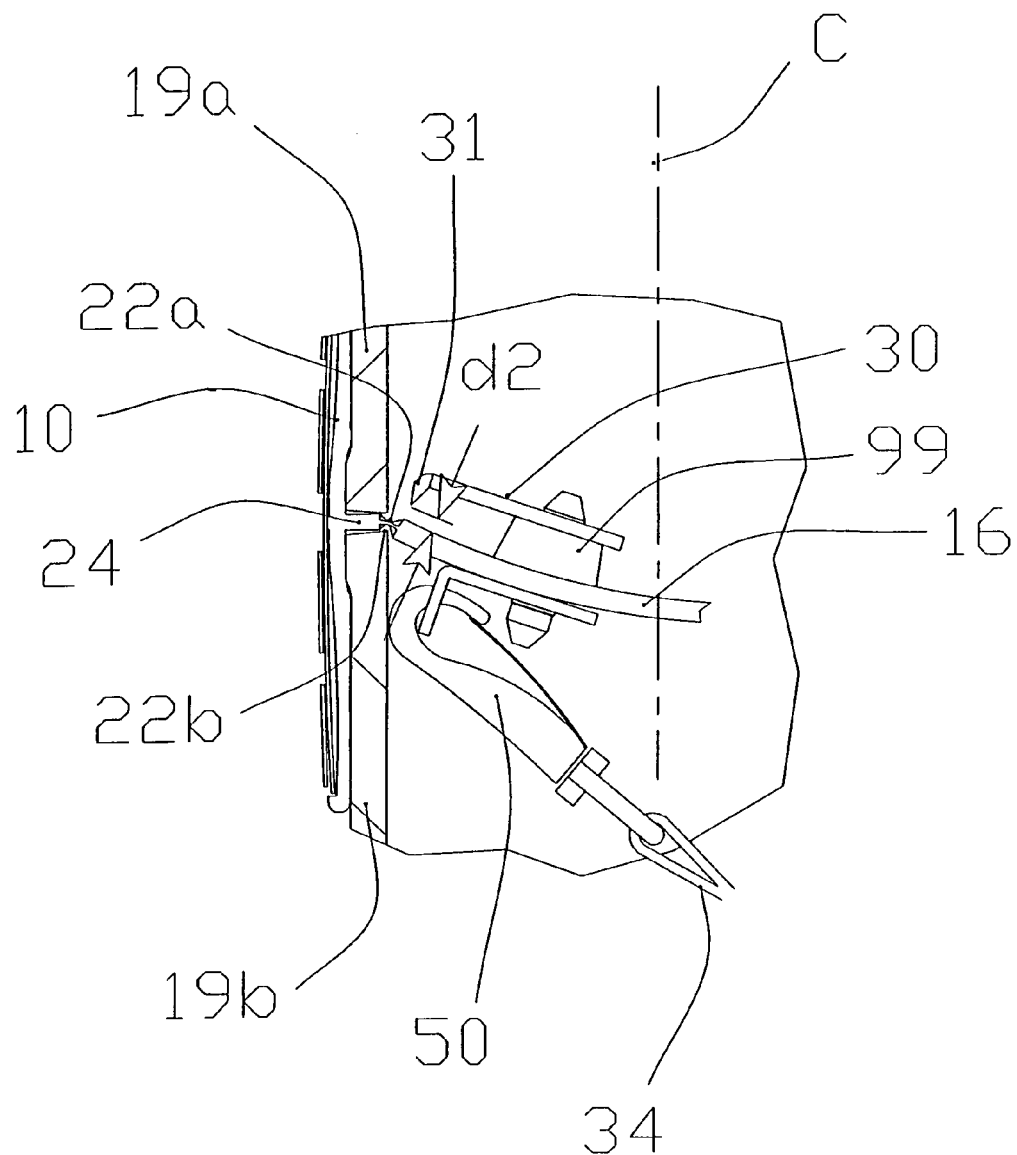
FIG. 9 is an enlarged, fragmentary, cross-sectional view depicting the piercing assembly used in the coupling of this invention avoiding premature puncturing of the disk when the water line is pressurized, causing the disk to bulge.

As depicted in FIG. 9, during testing the disk 16 while attached to the wall member 14 bulges towards the downstream pipe 19b. If a piercing assembly is at the center of the disk as taught in U.S. Pat. No. 6,622,748, the disk is sometimes prematurely pierced, thereby leaking and invalidating the test. In this embodiment of the invention the piercing assembly 30, having the pin 30c being offset from the center C1 of the disk 16, avoids this problem. Moreover, spacing the piercing end 31 away from the upstream side S1 of the disk 16 further ameliorates this potential problem of premature piercing during testing. The spacer members 30d and 30d' maintain the piercing end 31 spaced from the groove 22a a sufficient distance $d_2$ (FIG. 9). Typically, this distance $d_2$ is substantially from 0 to 0.1 inch. Additionally, when the disk 16 bulges outward towards the downstream pipe 19b during testing as shown in FIG. 9, the leg 33b having its end 36 offset inwardly from the piercing end 31 does not touch the surface S3 (FIG. 2) of the wall member 14.

As depicted in FIGS. 8A-8C, after testing to detect leaks in a water line including the upstream pipe 19a and the downstream pipe 19b connected together by the coupling 10, and with water to the line shut off to prevent it from flowing through the water line, the disk 16 is removed from the body member 12 of the coupling 10. The pulling member 34 enables a user while the coupling 10 is installed to pull the piercing member 30a towards the planar disk 16 using the pulling member 34. This pulling member 34 may be a strap having one end 34a tied to the slot 33a and another end 34b extending out of the side opening 20 in the downstream pipe 19b. In one embodiment, the strap 34 has the clip 50 attached to its end 34a and this clip is detachably connected to the aperture 33c in the lever member 30b.

A user grasps the strap end 34b and pulls on this end to pierce the disk 16 at the groove 22a. Pulling on the member 34 rotates the entire piercing assembly 30 counter-clockwise as viewed in FIG. 8A or 10, causing the piercing member 30a to be pulled towards the planar disk 16 to pierce the disk at the groove 22a, Continued pulling of the pulling member 34 results in the disk 16 being completely torn away and separated from the body member 12 of the coupling 10 and pulled through the side opening 20 in the downstream pipe 19b or an open end 52a of the straight downstream pipe 52 (FIG. 10), When a downstream Wye-fitting pipe 19b is used having its branched section positioned as depicted in FIGS. 8A through 8C, the tool T is used to assist in completely detaching the disk 16 from the body member 12 of the coupling 10. This tool T is not needed when the downstream pipe 19b is used where its branched section at an obtuse angle with respect to its straight section as depicted in FIG. 8D.

Figure 7:
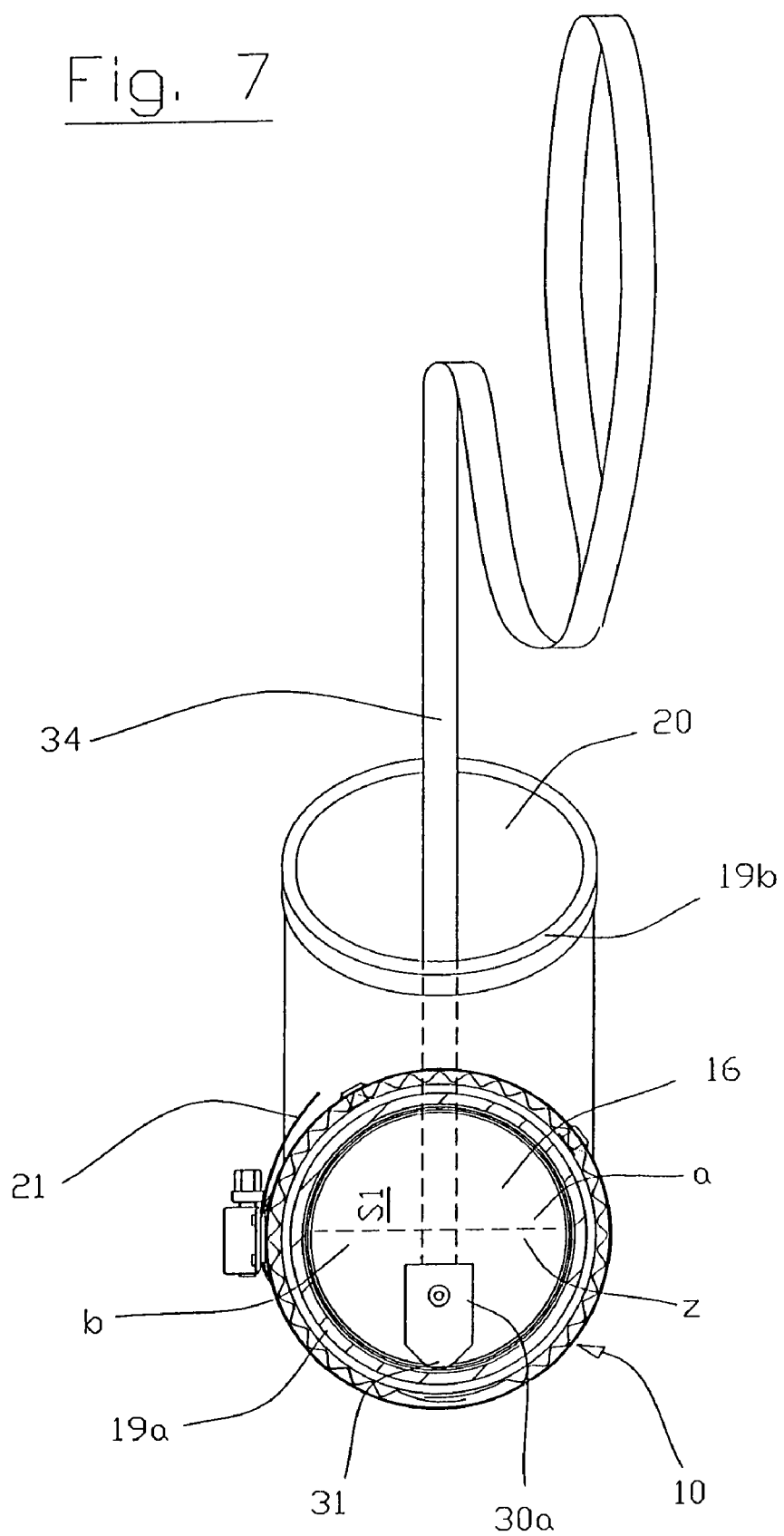
FIG. 7 is a sectional view taken along line 7-7 of FIG. 8A.
Figure 7A:
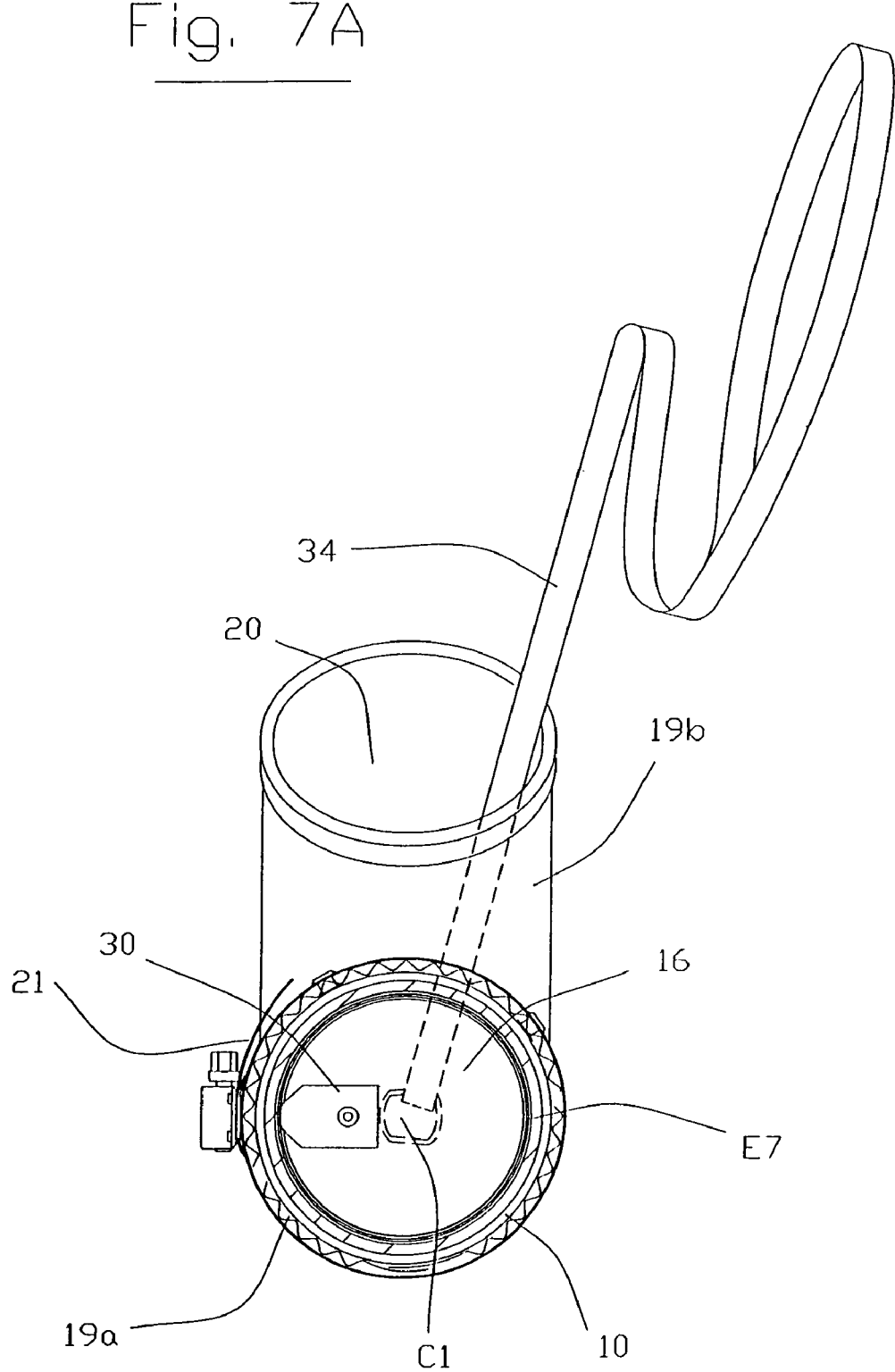
FIG. 7A is a sectional view similar to that shown in FIG. 7 with the piercing assembly at a 9:00 o'clock position.
Figure 7C:
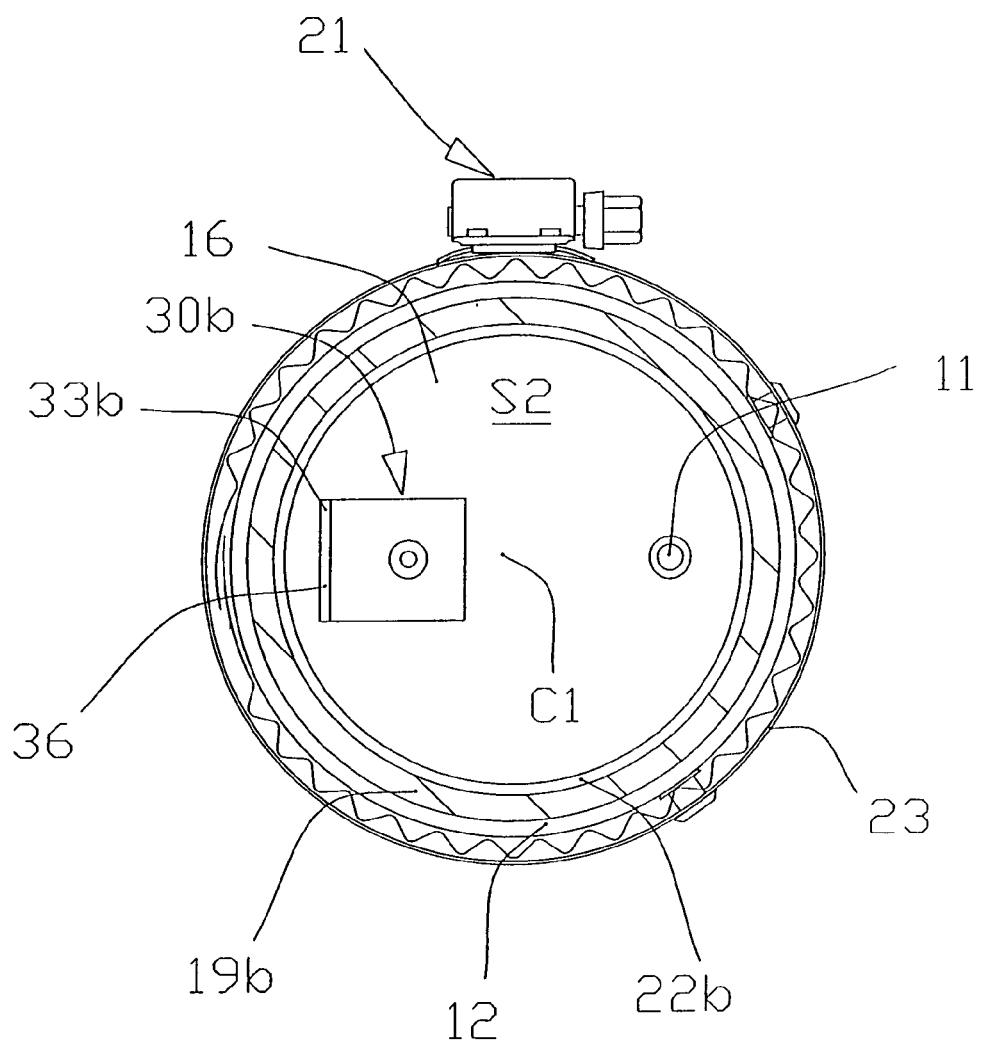
FIG. 7C is a cross-sectional view taken along line 7C-7C of FIG. 8A.

FIGS. 7, 7A and 7B illustrate removing the disk 16 when a downstream Wye-fitting pipe 19b is used. In this situation, the coupling 10 is positioned so that the piercing end 31 of the piercing assembly 30 is within a zone Z (FIG. 7) in the upstream pipe 19a having an area that substantially corresponds to substantially half of the cross-sectional area of the upstream pipe that is furthest from the side opening 20 in the Wye-fitting downstream pipe 19b. In this embodiment this zone Z is semi-circular as depicted in FIG. 7 by the dotted line a and the semi-circular portion of the groove 22a identified by the letter b. FIG. 7 shows the piercing assembly 30 centered within this zone Z with the piercing end 31 at a 6 o'clock position. FIG. 7A shows the piercing assembly 30 still within this zone Z with the piercing end 31 at a 9 o'clock position. Further rotation of the body member in a clockwise direction as viewed in FIG. 7A would move the piercing assembly 30 out of the zone Z. FIG. 7B shows the piercing assembly 30 still within this zone Z with the piercing end 31 at a 3 o'clock position. Further rotation of the body member 12 in a counter-clockwise direction as viewed in FIG. 7B would move the piercing assembly 30 out of the zone Z. With the piercing assembly 30 within the zone Z as depicted in the FIGS. 7, 7A, and 7B, the user grasps the end 34b of the pulling member 34, pulling it outward through the side opening 20 to rotate piercing assembly 30 in a counter-clockwise direction as viewed in FIG. 8A, thus partially detaching the disk 16 from the body member 12 of the coupling 10 as shown in FIG. 8B. In order to detach completely the disk 16 from the body member 12 of the coupling 10, the user, as shown in FIG. 8C, pushes the tool T inward through the side opening 20 engaging a portion P of the pulling member 34 (in this case the clip 50) and concurrently pulling on the pulling member to separate completely the disk 16 from the body member 12 of the coupling 10.

Figure 11:
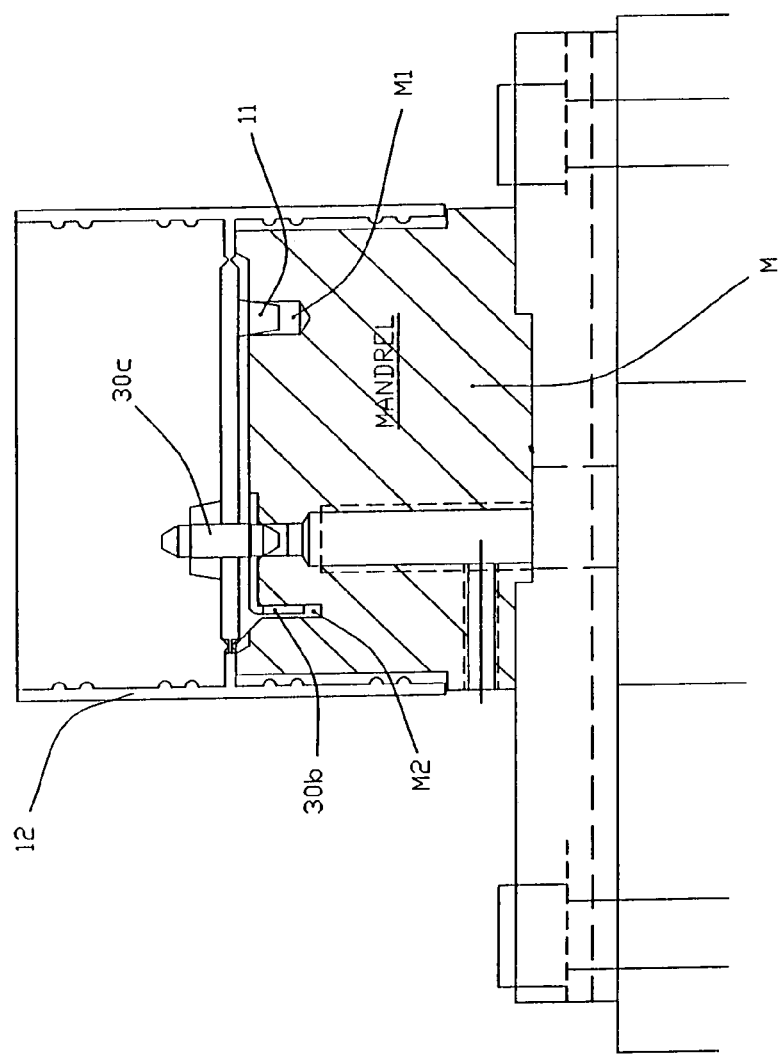
FIG. 11 is a cross-sectional view depicting the assembly of the piercing member, pin, and lever member in a mandrel.

As depicted in FIG. 11, the locator 11 is used to position properly the body member 12 and the lever member 30b when attaching the lever member to the adjacent downstream side S2 of the planar disk 16. A mandrel M interacts with a press 102 (FIG. 12) to attach the components of the piercing assembly 30 together as discussed above. The mandrel M includes recesses M1 and M2 that respectively receive the locator 11 and the leg 33b of the lever 30b. Placing the locator 11 in the recess M1 and the leg 33b in the recess M2 properly aligns and positions the leg 33b with respect to the piercing member 30a. Upon closure, the press 102 presses the piercing member 30a and lever member 30b onto the pin 30c to connect these components so they do not move relative to each other.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

The invention claimed is:
1. A coupling used during testing of a water line including an upstream pipe and a downstream pipe, said coupling comprising
   a wall member having a longitudinal centerline, and
   a removable substantially planar disk within the wall member, integral therewith, and substantially at a right angle to the wall member,
   said planar disk having a center with said longitudinal centerline intersecting said center substantially at a right angle to the disk and said planar disk forming within the wall member on opposite sides thereof a first section sized to receive the upstream pipe and a second section sized to receive the downstream pipe,
   said planar disk having an upstream surface and a downstream surface, said upstream surface having therein a groove, said groove having an outer perimeter offset inward from the wall member a predetermined distance to provide, upon removal of the planar disk, a pipe stop extending outward from an inside surface of the cylindrical wall member substantially at a right angle to the wall member to enable an end of the upstream pipe to abut an upstream side of the annular pipe stop and an end of the downstream pipe to abut a downstream side of the annular pipe stop, and
   a piercing assembly attached to the disk and offset with respect to the center of the planar disk, said piercing assembly including
      a piercing member mounted to the upstream side of the planar disk and having a piercing end aligned with the groove and spaced away from the groove, said piercing member adapted to be pulled manually towards the planar disk to pierce said planar disk at the groove, and
      a lever member mounted to the downstream side of the planar disk and oriented substantially in the same manner as the piercing member and having an outer terminal end offset inward from the groove, and
      a pulling member to attached to said outer terminal end of the lever member to enable a user while the coupling is installed in a water line to pull the lever member, causing the piercing assembly to rotate and advance the piercing member towards the planar disk and pierce said planar disk at the groove.

2. The coupling of claim 1 where the piercing assembly includes
   a pin element that extends through the disk and has a first end projecting from said upstream side of the disk and a second end projecting from said downstream side of the disk,
   said piercing member at an inner terminal end being attached to the first end and said lever member at an inner terminal end being attached to the second end.

3. The coupling of claim 2 where the planar disk includes a central spacer member and the cylindrical wall, planar disk, and spacer member are molded as a unitary structure and made of a rubber or plastic to provide a single piece body member, and the pin element is bonded to the central spacer member during molding.

4. The coupling of claim 1 where the pipe stop has a predetermined thickness and the disk has a thickness that is greater than the predetermined thickness of the pipe stop.

5. The coupling of claim 1 where the cylindrical wall and planar disk are a single piece body member molded as a unitary structure and made of a rubber or plastic.

6. A coupling used during testing of a water line including an upstream pipe and a downstream pipe, each pipe having a substantially circular circumferential configuration, said coupling comprising
   a single piece elastic body member molded as a unitary structure including
      an upstream wall section having an internal circumferential circular configuration substantially the same as the circular circumferential configuration of the upstream pipe and sized to receive the upstream pipe,
      a downstream wall section having an internal circumferential circular configuration substantially the same as the circular circumferential configuration of the downstream pipe and sized to receive the downstream pipe, and a removable disk disposed between the upstream wall section and the downstream wall section to block the flow of water between the wall sections, said disk having a perimeter and a groove therein nearby said perimeter, and a piercing assembly attached to the planar disk by a fulcrum element offset with respect to a center of the planar disk, said piercing assembly including a piercing member having a piercing end aligned with the groove and another end attached to the fulcrum element, said piercing member mounted to the planar disk on one side thereof to be pulled towards the planar disk to pierce said planar disk at the groove, and a lever member mounted to planar disk on the other side of the planar disk to enable the lever member to be manually pulled.

7. The coupling of claim 6 where the fulcrum element comprises a pin element that extends through the disk and has a first end projecting from said one side of the disk and a second end projecting from another side of the disk, said another end of the piercing member being attached to the first end and said lever member being attached to the second end, and a spacer member mounted on the pin element between the piercing member and said one side of the disk to space the piercing end of the piercing member away from the groove substantially from 0 to 0.1 inch.

8. The coupling of claim 7 where the piercing end of the piercing member is spaced from the groove substantially from 0 to 0.1 inch, the downstream side of the disk includes a substantially continuous substantially V-shaped groove therein nearby said perimeter, said V-shaped groove in the downstream side of the disk being in substantial registration with the groove on the upstream side of the disk.

9. The coupling of claim 8 where the groove on the upstream side of the disk has an outer perimeter offset inward from the cylindrical wall member a predetermined distance substantially from 0.10 to 0.28 inch to provide, upon removal of the planar disk, an annular pipe stop extending outward from an inside surface of the cylindrical wall member substantially at a right angle to the wall member to enable an end of the upstream pipe to abut one side of the annular pipe stop and an end of the downstream pipe to abut another side of the annular pipe stop.

10. The coupling of claim 9 where the pipe stop has a predetermined thickness and the disk has a thickness that is greater than the predetermined thickness of the pipe stop.

* * * * *